(12) United States Patent
Nogami et al.

(10) Patent No.: US 10,605,114 B2
(45) Date of Patent: Mar. 31, 2020

(54) VALVE DEVICE AND STEAM TURBINE EQUIPMENT

(71) Applicant: MITSUBISHI HEAVY INDUSTRIES COMPRESSOR CORPORATION, Tokyo (JP)

(72) Inventors: Tomoaki Nogami, Hiroshima (JP); Takuro Koda, Hiroshima (JP); Kenichi Nishiyama, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 20 days.

(21) Appl. No.: 15/771,064

(22) PCT Filed: Oct. 28, 2015

(86) PCT No.: PCT/JP2015/080387
§ 371 (c)(1),
(2) Date: Apr. 25, 2018

(87) PCT Pub. No.: WO2017/072880
PCT Pub. Date: May 4, 2017

(65) Prior Publication Data
US 2018/0306050 A1    Oct. 25, 2018

(51) Int. Cl.
| F01D 17/10 | (2006.01) |
| F01D 17/12 | (2006.01) |
| F01D 17/18 | (2006.01) |
| F16K 31/44 | (2006.01) |
| G05D 7/06 | (2006.01) |
| F16K 31/528 | (2006.01) |
| F16K 11/16 | (2006.01) |

(52) U.S. Cl.
CPC ............. F01D 17/10 (2013.01); F01D 17/12 (2013.01); F01D 17/18 (2013.01); F16K 11/16 (2013.01);
(Continued)

(58) Field of Classification Search
CPC ...... F01D 17/14; F01D 17/141; F01D 17/145; F01D 17/18; F01D 17/10; F01D 17/105;
(Continued)

(56) References Cited

U.S. PATENT DOCUMENTS 3,642,381 A    2/1972  Wickl
4,456,032 A    6/1984  Straslicka
(Continued)

FOREIGN PATENT DOCUMENTS

EP    2813674 A1    12/2014
FR     401118 A     8/1909
(Continued)

OTHER PUBLICATIONS

International Search Report issued in corresponding International Application No. PCT/JP2015/080387 dated Jan. 26, 2016 (4 pages).
(Continued)

*Primary Examiner* — Mark A Laurenzi
*Assistant Examiner* — Xiaoting Hu
(74) *Attorney, Agent, or Firm* — Osha Liang LLP (57) ABSTRACT

A valve device includes a main steam valve that is provided on a steam flow channel, a regulating valve that is provided on the steam flow channel to be connected to the main steam valve in series and that includes a first valve seat and a first valve body, an overload valve that is provided on a branch flow channel which connects a portion of the steam flow channel between the main steam valve and the regulating valve and a steam turbine to each other and that includes a second valve seat and a second valve body, and a driving (Continued)

unit that drives the first valve body and the second valve body as a common driving source of the first valve body and the second valve body such that the first valve body and the second valve body are interlocked with each other.

6 Claims, 5 Drawing Sheets

(52) U.S. Cl.
CPC ............ *F16K 31/44* (2013.01); *F16K 31/528* (2013.01); *F05D 2220/31* (2013.01); *G05D 7/0647* (2013.01)

(58) Field of Classification Search
CPC ... F01D 17/12; F01K 7/18; F01K 7/20; F01K 13/006; F01K 13/02; G05D 7/0641; G05D 7/0647; G05D 7/0642; G05D 7/0664; F05D 2220/31; F05D 2270/3061; F16K 11/16; F16K 11/161; F16K 11/163; F16K 11/165; F16K 11/166; F16K 11/168; F16K 31/44; F16K 31/528
See application file for complete search history.

(56) References Cited

U.S. PATENT DOCUMENTS

| | | |
|---|---|---|
| 2015/0020527 A1 | 1/2015 | Ebbing et al. |
| 2015/0125266 A1* | 5/2015 | Takahashi ............... F01D 1/023 415/116 |
| 2016/0010508 A1* | 1/2016 | Kawashima ............ F01D 17/18 416/146 R |

FOREIGN PATENT DOCUMENTS

| | | |
|---|---|---|
| JP | 0025395 B | 2/1914 |
| JP | S44-29201 B | 11/1969 |
| JP | S62-011281 Y | 3/1987 |
| JP | H02-046002 U | 3/1990 |
| JP | 2013-147937 A | 8/2013 |
| JP | 2015-052311 A | 3/2015 |
| WO | 2014/155579 A1 | 10/2014 |

OTHER PUBLICATIONS

Written Opinion issued in corresponding International Application No. PCT/JP2015/080387 dated Jan. 26, 2016 (9 pages).
Office Action issued in corresponding Japanese Application No. 2017-547252 dated Jan. 9, 2018 (7 pages).

* cited by examiner

VALVE DEVICE AND STEAM TURBINE EQUIPMENT

TECHNICAL FIELD

The present invention relates to a valve device and a steam turbine equipment.

BACKGROUND

A steam turbine is used for the purpose of driving a machine or the like and is provided with a turbine main body that includes a rotatably supported rotor. The rotor is driven to be rotated when steam is supplied to the turbine main body as working fluid. Steam to be supplied to the turbine main body or steam extracted from the turbine main body flows in a steam flow channel of the steam turbine. The steam flow channel is provided with a regulating valve. It is possible to adjust the flow rate of steam to be supplied to the turbine main body by adjusting the openness of the regulating valve.

Furthermore, a steam turbine that is provided with an overload valve in addition to the above-described regulating valve is also known (refer to Patent Document 1 below). In steam turbine equipment described in Patent Document 1, an overload valve is provided on a bypass pipe that branches off from a main steam pipe. It is possible to supply main steam to a middle stage of a high-pressure turbine by opening the overload valve.

CITATION LIST

Patent Literature

Patent Document 1 United States Patent Application, Publication No. 2015/0020527

However, in the case of a technology described in Patent Document 1 above, there is a possibility that it is difficult to synchronize the regulating valve and the overload valve. Furthermore, in a case where the regulating valve and the overload valve are opened or closed individually, pressure loss in these valve devices becomes great and thus there is a possibility that the efficiency of the steam turbine is influenced.

SUMMARY

One or more embodiments provide a valve device and steam turbine equipment having a simple configuration and a sufficient efficiency.

According to a first aspect of the invention, a valve device includes a main steam valve that is provided on a steam flow channel which guides steam to a steam turbine and that adjusts an opening and closing state of the steam flow channel, a regulating valve that is provided on the steam flow channel to be connected to the main steam valve in series and that includes a first valve seat which is exposed in the steam flow channel and a first valve body which abuts or is separated from the first valve seat to adjust a flowing state in the steam flow channel, an overload valve that is provided on a branch flow channel which connects a portion of the steam flow channel between the main steam valve and the regulating valve and the steam turbine to each other and that includes a second valve seat which is exposed in the branch flow channel and a second valve body which abuts or is separated from the second valve seat to adjust a flowing state in the branch flow channel, and a driver that drives the first valve body and the second valve body as a common driving source of the first valve body and the second valve body such that the first valve body and the second valve body are interlocked with each other.

According to one or more embodiments of the above-described configuration, the first valve body and the second valve body can be interlocked by means of the driving unit, which is the common driving source. Therefore, it is possible to simplify the configuration of a device.

According to a second aspect of the invention, the valve device in the first aspect may further include a delaying and interlocking unit that delays the driving of the second valve body of the overload valve until the regulating valve enters a fully-opened state with the first valve body being driven.

According to one or more embodiments of the above-described configuration, the driving of the overload valve is delayed by the delaying and interlocking unit until the regulating valve enters the fully-opened state. Therefore, it is possible to operate the device in on overload state.

According to a third aspect of the invention, in the valve device in the first or second aspect, the steam turbine may include a plurality of pressure stages that are arranged from a high-pressure side to a low-pressure side, the steam flow channel may be connected to a pressure stage in the steam turbine, which is closest to the high-pressure side, and the branch flow channel may be connected to a second or subsequent pressure stage in the steam turbine.

According to one or more embodiments of the above-described configuration, since the branch flow channel is connected to the pressure stage in the steam turbine, which is closest to the high-pressure side, it is possible to further improve the output of the steam turbine by supplying steam from the branch flow channel as well in addition to a supplying amount from the steam flow channel. That is, it is possible to operate the steam turbine in an overload state.

According to a fourth aspect of the invention, the valve device in the third aspect may further include a flow guide that is provided between the overload valve and the pressure stages and that changes a flowing direction of steam passing through the overload valve.

According to one or more embodiments of the above-described configuration, since the flow guide is provided, the flowing direction of steam passing through the overload valve can be changed. That is, it is possible to reduce a possibility of uneven distribution of steam in the pressure stages of the steam turbine.

According to a fifth aspect of the invention, in the valve device in the fourth aspect, the flow guide may include a guide main body that extends in a circumferential direction of the steam turbine and a slit that extends from an outer circumferential side of the steam turbine to an inner circumferential side of the steam turbine toward the low-pressure side from the high-pressure side may be formed in the guide main body.

According to one or more embodiments of the above-described configuration, since the slit is provided, it is possible to cause steam, which proceeds to the inner circumferential side of the steam turbine from the outer circumferential side of the steam turbine, to temporarily stay near an outer circumferential side of the slit. Thereafter, the steam is uniformized in the circumferential direction and flows toward an inner circumferential side of the slit. Accordingly, it is possible to reduce uneven distribution of steam in the circumferential direction in the steam turbine.

According to a sixth aspect of the invention, in the valve device according to any one of the first to fifth aspects, a through-hole through which a portion of steam in the branch flow channel flows may be formed in the second valve body of the overload valve.

According to one or more embodiments of the above-described configuration, even in a state where the overload valve is closed, steam is supplied from the inside of the branch flow channel to the inside of the steam turbine through the through-hole of the second valve body. It is possible to preheat the inside of the steam turbine with the steam.

According to a seventh aspect of the invention, a steam turbine equipment includes the valve device according to any one of the first to sixth aspects and a steam turbine that is driven by steam guided through the valve device.

According to one or more embodiments of the above-described configuration, it is possible to provide a steam turbine having a simple configuration and a sufficient efficiency.

According to one or more embodiments of the invention, it is possible to provide a valve device and a steam turbine having a simple configuration and a sufficient efficiency.

DETAILED DESCRIPTION

Figure 1:
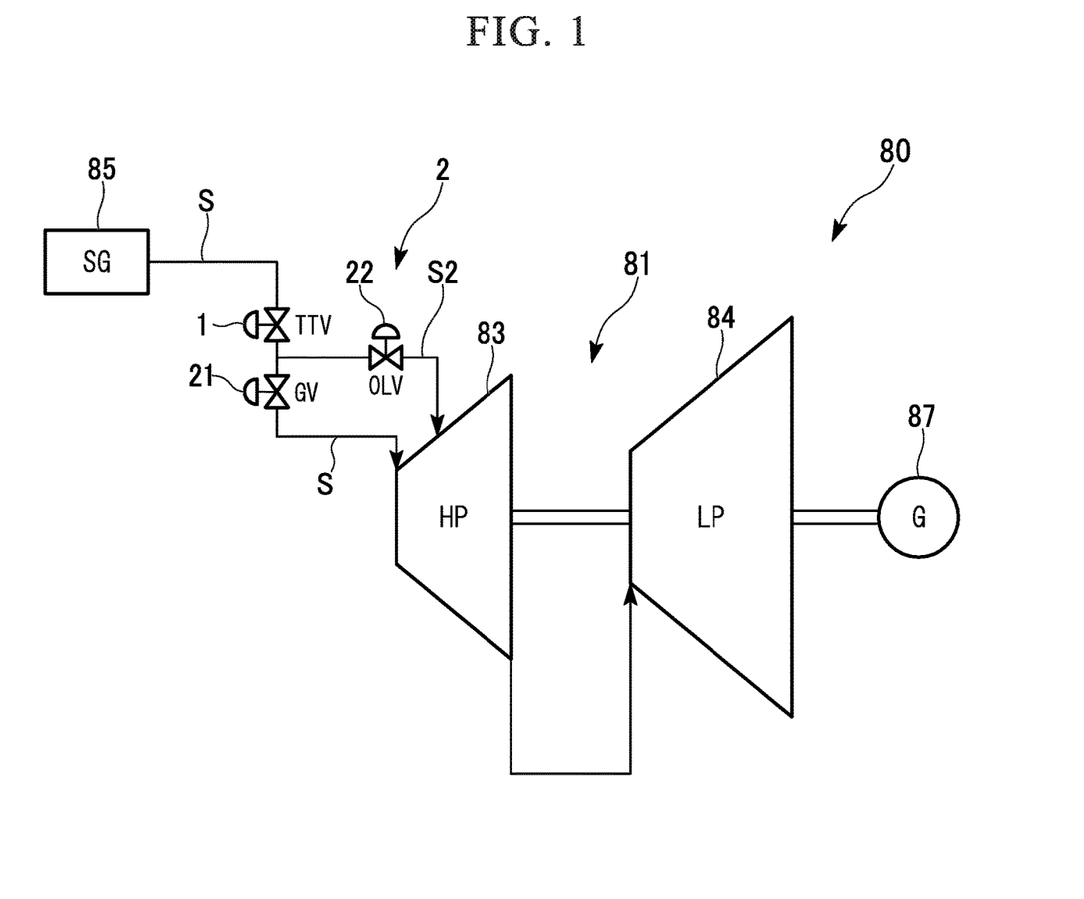
FIG. 1 is a schematic view showing a configuration of steam turbine equipment according to one or more embodiments of the invention.

Embodiments of the invention will be described with reference to drawings. As shown in FIG. 1, steam turbine equipment 80 as a power generating system according to one or more embodiments is provided with a steam turbine 81 including a high-pressure steam turbine 83 and a low-pressure steam turbine 84, a boiler 85 that supplies high-pressure steam to the high-pressure steam turbine 83, and a power generator 87 that is driven by a rotation drive force of the steam turbine 81.

Each of the high-pressure steam turbine 83 and the low-pressure steam turbine 84 includes a plurality of pressure stages that are arranged from a high-pressure side to a low-pressure side. Among these, a steam flow channel S through which steam from the boiler 85 flows is connected to a pressure stage in the high-pressure steam turbine 83, which is closest to the high-pressure side (inlet side).

The steam flow channel S that connects the boiler 85 and the high-pressure steam turbine 83 to each other is provided with a main steam valve 1 (TTV) and a combination valve 2 (valve device) that is provided to be connected to the main steam valve 1 in series. It is possible to select whether steam is supplied to the high-pressure steam turbine 83 or not (opening and closing state of steam flow channel S) by opening or closing the main steam valve 1.

The combination valve 2 includes a regulating valve 21 and an overload valve 22 as main components. When the openness of the regulating valve 21 is adjusted, the flowing state of steam to the high-pressure steam turbine 83 is adjusted. The overload valve 22 is provided on a branch flow channel S2 that branches off from the steam flow channel S at a position between the main steam valve 1 and the regulating valve 21. A downstream side end portion of the branch flow channel S2 is connected to a second or subsequent pressure stage (pressure stage on high-pressure side) in the high-pressure steam turbine 83 of the steam turbine 81.

Figure 2:
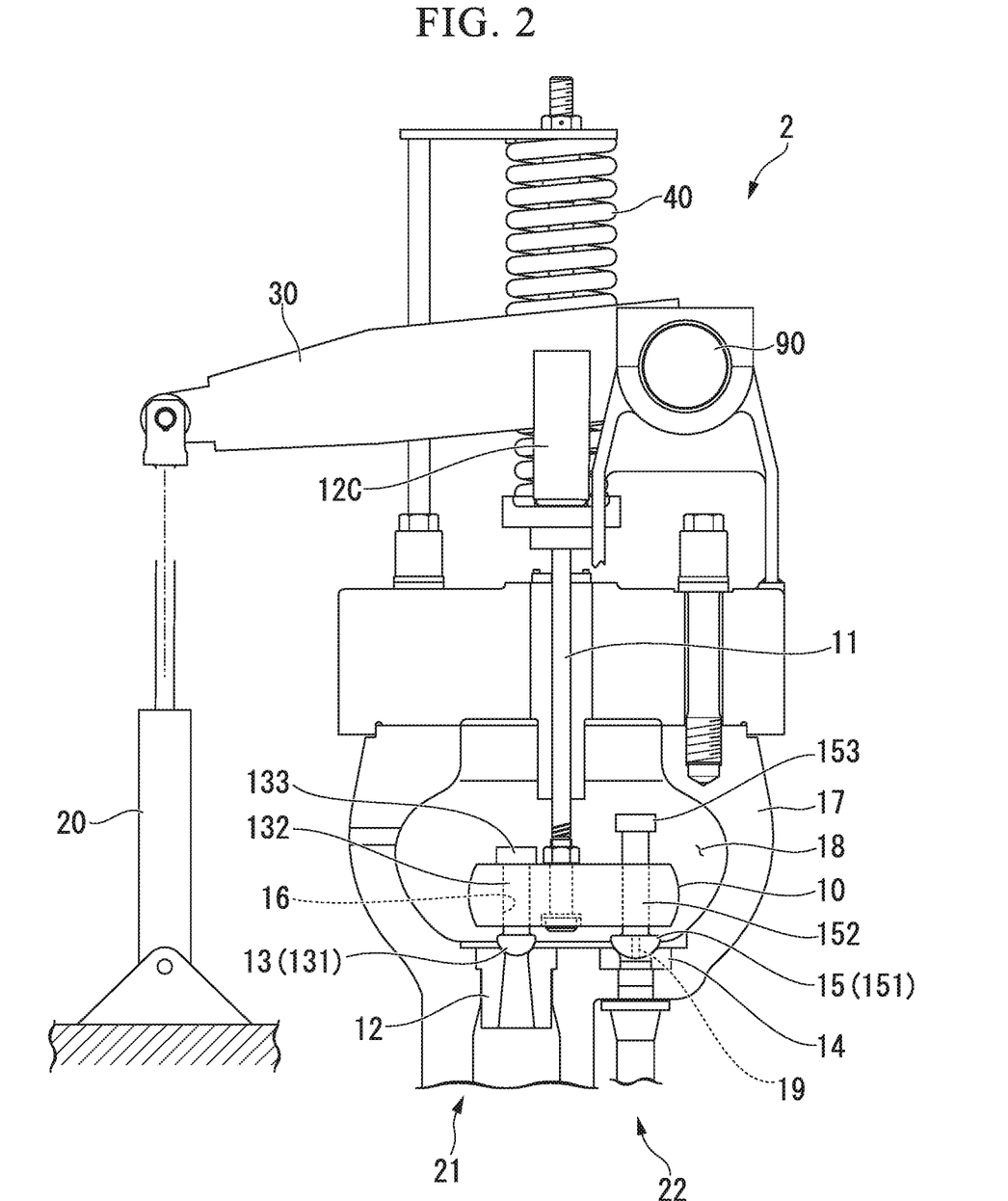
FIG. 2 is a sectional view showing a configuration of a valve device according to one or more embodiments of the invention.

FIG. 2 is a view showing a configuration of the combination valve 2 according to one or more embodiments. As shown in the drawing, in the combination valve 2, the regulating valve 21 and the overload valve 22 are accommodated in the same valve chamber 18. More specifically, the combination valve 2 is provided with the regulating valve 21, the overload valve 22, a valve body holder 10 (delaying and interlocking unit), a valve rod 11, an arm 30, and a hydraulic cylinder 20.

The regulating valve 21 includes a first valve seat 12 that is exposed in the steam flow channel S and a first valve body 13 that abuts or is separated from the first valve seat 12. The overload valve 22 includes a second valve seat 14 that is exposed in the branch flow channel S2 and a second valve body 15 that abuts or is separated from the second valve seat 14. Furthermore, both of the first valve body 13 of the regulating valve 21 and the second valve body 15 of the overload valve 22 are held by the valve body holder 10. The valve body holder 10 is a member that is formed to have a thick plate-like shape and in which a plurality of through-holes 16 are formed in a thickness direction thereof. The first valve body 13 and the second valve body 15 are inserted into the through-holes 16. Furthermore, the first valve body 13, the second valve body 15, and the valve body holder 10 are accommodated in the valve chamber 18 that is defined by a valve case 17.

Note that, in the second valve body 15, a through-hole 19 (heat air hole 19) that penetrates the second valve body 15 in a steam flowing direction is formed. The through-hole 19 is open even in a state where the second valve body 15 abuts the second valve seat 14 (that is, state where overload valve 22 is closed). That is, a steam in the branch flow channel S2 flows toward the downstream side of the overload valve 22 through the through-hole 19.

The valve rod 11 is connected to the valve body holder 10. The valve rod 11 moves the valve body holder 10 by reciprocating inside the valve case 17. One of opposite end portions of the valve rod 11 that is on a side opposite to the valve body holder 10 side is connected to the arm 30 via an arm connection portion 12C. The arm 30 is a rod-shaped member that can rotate around a rotation shaft 90 provided on a portion of the valve case 17. Furthermore, the arm connection portion 12C is urged in a direction from an upper side to a lower side by a coil spring 40. An urging force generated by the coil spring 40 is transmitted to each of the valve body holder 10, the first valve body 13, and the second valve body 15 via the valve rod 11. Accordingly, in a state where no drive force is applied to the arm 30, the first valve body 13 abuts the first valve seat 12, the second valve body 15 abuts the second valve seat 14, and each of the regulating valve 21 and the overload valve 22 is closed.

Furthermore, a rod of the hydraulic cylinder 20 (driving unit) is connected to one of opposite end portions of the arm 30 that is on a side opposite to the rotation shaft 90 side. The hydraulic cylinder 20 causes the rod to reciprocate by means of hydraulic pressure. When the rod reciprocates, an end portion of the arm 30 rotates around the rotation shaft 90. Accordingly, the valve rod 11 is lifted up, and the first valve body 13 and the second valve body 15 are separated from the first valve seat 12 and the second valve seat 14, respectively. That is, the regulating valve 21 and the overload valve 22 are opened.

Here, the configurations of the first valve body 13 and the second valve body 15 will be described in detail. The first valve body 13 includes an approximately disc-shaped first valve main body 131 that abuts or is separated from the first valve seat 12, a first insert portion 132 that extends from the first valve main body 131 to form a rod-like shape and is inserted into the valve body holder 10, and a first cap portion 133 provided on an end portion of the first insert portion 132 that is on a side opposite to the first valve main body 131 side. Similarly, the second valve body 15 includes a second valve main body 151, a second insert portion 152, and a second cap portion 153. Here, the second valve main body 151 is formed such that the sizes thereof are slightly greater than those of the first valve main body 131. Furthermore, a height of the second insert portion 152 in a vertical direction is set to be larger than that of the first insert portion 132.

Therefore, in a case where the valve body holder 10 is lifted up with the hydraulic cylinder 20 being driven, the first valve body 13 is immediately lifted up. On the second valve body 15 side, the second valve body 15 is not separated from the second valve seat 14 since the valve body holder 10 only slides upward along the second insert portion 152. That is, even when the first valve body 13 is in a fully-opened state, the second valve body 15 does not enter an opened state immediately. In other words, the second valve body 15 is configured to be interlocked while being delayed with respect to the first valve body 13. Therefore, it is possible to cause the overload valve 22 to be opened after the regulating valve 21 enters a fully-opened state.

Steam that is supplied with the overload valve 22 being opened as described above is supplied to a second or subsequent pressure stage of the steam turbine 81 (high-pressure steam turbine 83) through the branch flow channel S2. Here, the branch flow channel S2 is provided only in a portion of the steam turbine 81 in a circumferential direction. Therefore, steam supplied from the branch flow channel S2 may be unevenly distributed in the circumferential direction of the steam turbine 81.

Figure 3:
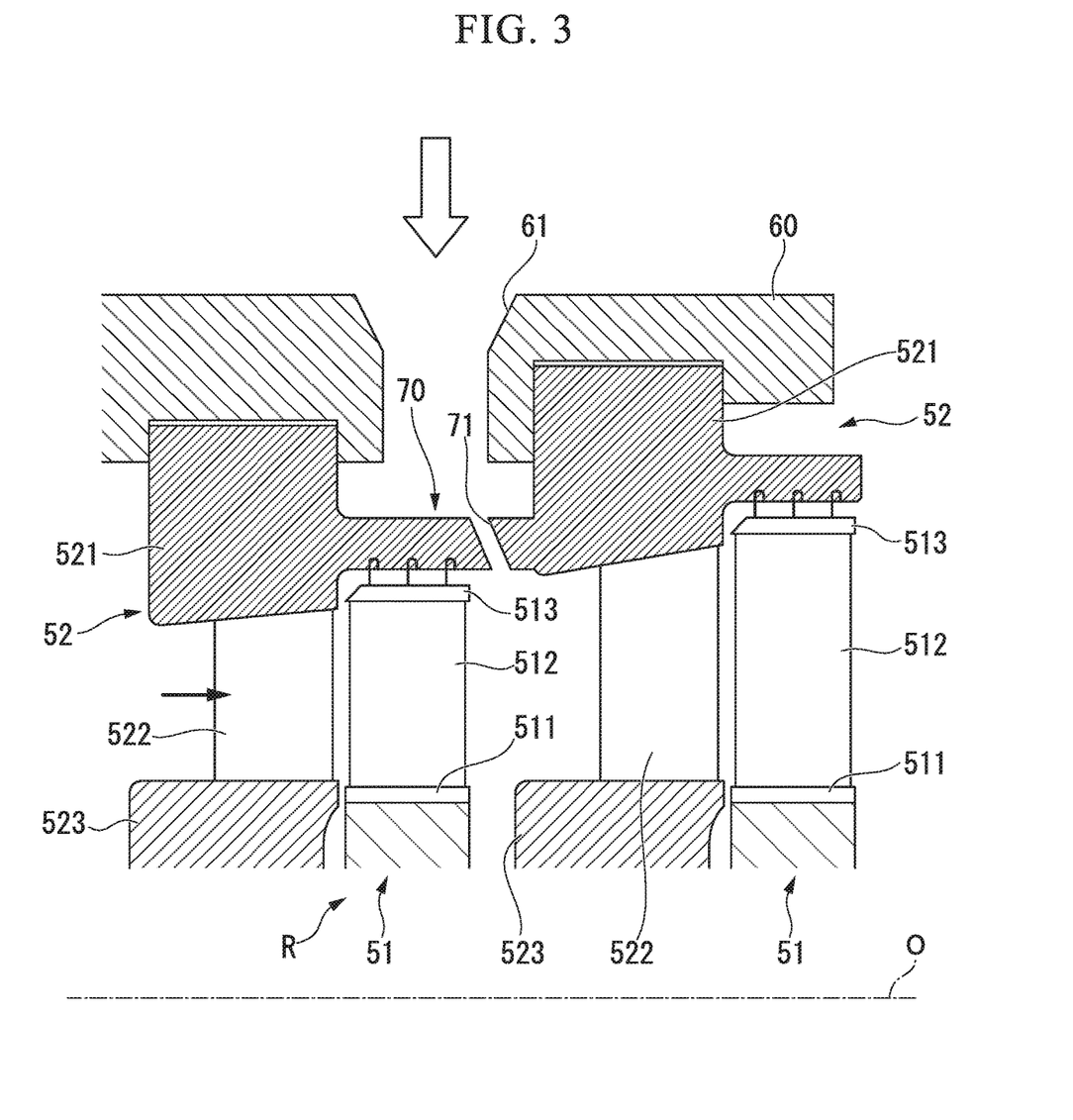
FIG. 3 is a sectional view showing a main portion of the steam turbine equipment according to one or more embodiments of the invention.

Therefore, in the steam turbine 81 (high-pressure steam turbine 83) according to one or more embodiments, a flow guide 70 for changing the flow of steam is provided as shown in FIG. 3. FIG. 3 is a view showing only one pair of pressure stages facing each other in the steam turbine 81. The steam turbine 81 includes a rotor R that rotates around an axis O, a plurality of blades 51 that are arranged at intervals in the circumferential direction along an outer circumferential surface of the rotor R, a casing 60 that surrounds the rotor R from an outer circumferential side, a plurality of vanes 52 that are arranged at intervals in the circumferential direction along an inner circumferential surface of the casing 60, and the flow guide 70 that is attached between the vanes 52 in a direction along the axis O.

Each vane 52 includes an outer ring 521 that is formed to have an annular shape extending along the inner circumference of the casing 60 with respect to the inner circumferential surface of the casing 60, a vane main body 522 that is attached to an inner side of the outer ring 521 in a radial direction extending from the axis O, and an inner ring 523 that is attached to an inner side of the vane main body 522 in the radial direction.

Each blade 51 includes a platform 511 that is attached onto the outer circumferential surface of the rotor R, a blade main body 512 that is attached to an outer side of the platform 511 in the radial direction extending from the axis O, and an outer shroud 513 that is attached to an outer side of the blade main body 512 in the radial direction.

The above-described pressure stage is configured to include the plurality of vanes 52 that are arranged at intervals in the circumferential direction on the inner circumferential surface of the casing 60 of the steam turbine 81 and the plurality of blades 51 that are disposed on the downstream side of the row of vanes 52. On the downstream side of the outer ring 521, the flow guide 70 (guide main body) is provided. The flow guide 70 is a member that connects a downstream side end portion of the outer ring 521 and an upstream side end portion of another outer ring 521, which are adjacent to each other in the direction along the axis O, and has an annular shape extending in the circumferential direction of the axis O.

In the flow guide 70, a slit 71 that extends in the circumferential direction of the axis O and that is penetrated from a radially outer side to a radially inner side is formed. As seen from the circumferential direction of the axis O, the slit 71 is inclined such that the slit 71 becomes closer to the downstream side and becomes distant from the upstream side toward the radially inner side from the radially outer side.

Furthermore, as seen from the flow guide 70, in the casing 60 that is positioned radially outward of the axis O, an overload steam inlet 61 that communicates with the above-described branch flow channel S2 is formed. That is, steam is supplied to a middle pressure stage of the steam turbine 81 through the overload steam inlet 61.

According to the above-described configuration, the second valve body 15 of the overload valve 22 can enter an opened state later than the first valve body 13 of the regulating valve 21. Therefore, it is possible to open the overload valve 22 after the openness of the regulating valve 21 reaches 100% such that a load of the steam turbine 81 is further increased.

In addition, in the above-described configuration, the regulating valve 21 and the overload valve 22 are driven by the single hydraulic cylinder 20, which is the common driving source. Furthermore, it is possible to delay and interlock the regulating valve 21 and the overload valve 22 with each other only by providing the valve body holder 10 as a delaying and interlocking unit. That is, it is possible to greatly simplify the configuration of the device and thus it is possible to considerably reduce manufacturing cost and maintenance cost.

Furthermore, according to the above-described configuration, on the downstream side of the overload steam inlet 61, the flow guide 70, in which the slit 71 is formed, is provided. Therefore, it is possible to cause steam, which proceeds to an inner circumferential side of the steam turbine 81 from an outer circumferential side of the steam turbine 81, to temporarily stay near an outer circumferential side of the slit 71. Thereafter, the steam is uniformized in the circumferential direction and flows toward an inner circumferential side of the slit 71. That is, it is possible to reduce uneven distribution of steam in the circumferential direction in the steam turbine 81.

Furthermore, according to the above-described configuration, even in a state where the overload valve 22 is closed, steam is supplied from the inside of the branch flow channel S2 to the inside of the steam turbine 81 through the through-hole 19 of the second valve body 15. It is possible to preheat the inside of the steam turbine 81 with the steam.

Figure 4:
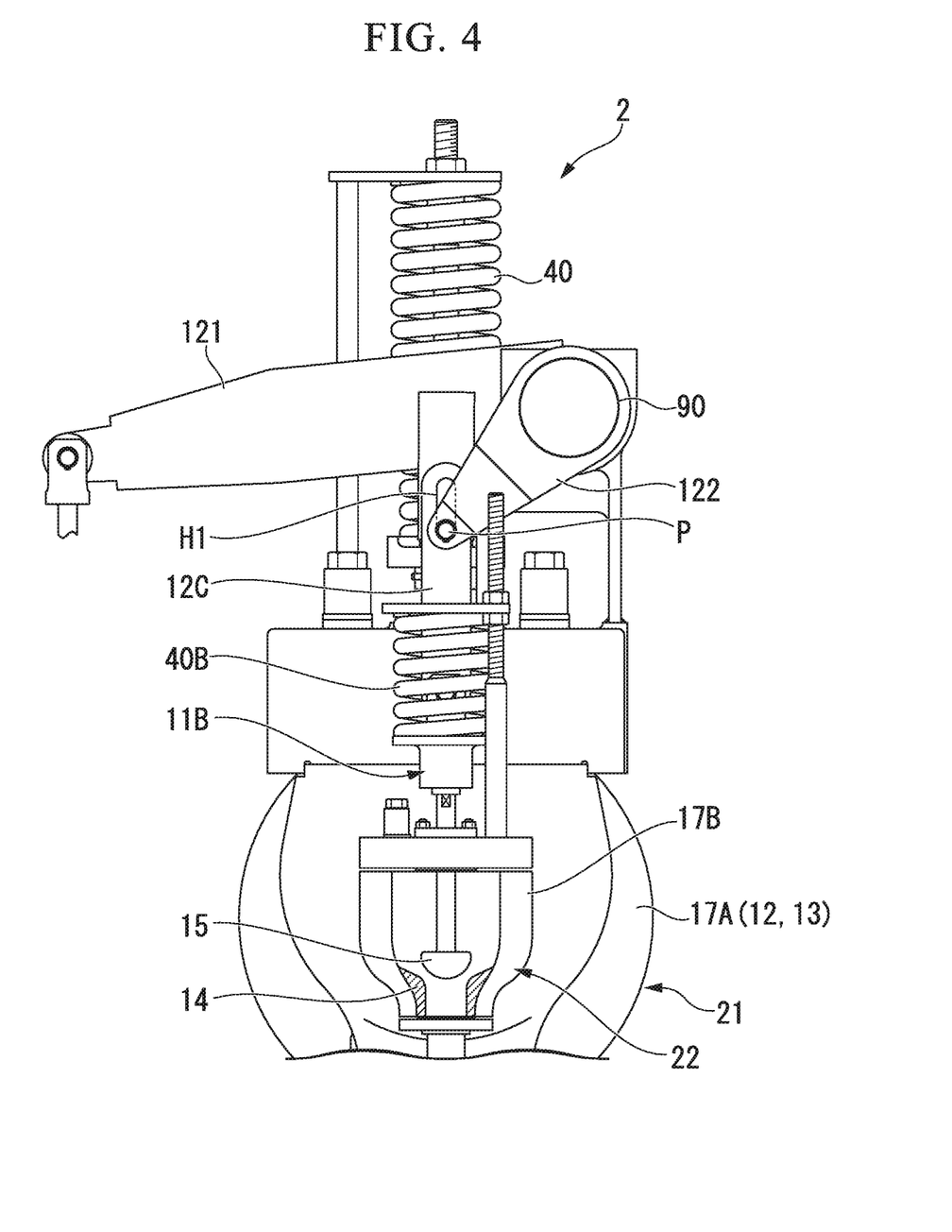
FIG. 4 is a schematic view showing a configuration of a valve device according to one or more embodiments of the invention.

Next, embodiments of the invention will be described with reference to FIG. 4.

In the combination valve 2 according to one or more embodiments, unlike in the previously-described embodiments, the valve case 17 for the regulating valve 21 and the valve case 17 for the overload valve 22 are different from each other. That is, the regulating valve 21 includes the first valve body 13, the first valve seat 12, and a first valve case 17A. The overload valve 22 includes the second valve body 15, the second valve seat 14, and a second valve case 17B. Furthermore, a second valve rod 11B is attached to the second valve body 15. As shown in FIG. 4, an end portion of the second valve rod 11B (end portion on side opposite to side on which second valve body 15 is provided) is exposed outside the overload valve 22.

Furthermore, the first valve case 17A is provided with two arms 30 (first arm 121 and second arm 122) that extend from the rotation shaft 90 in two different directions. An end portion of the first arm 121 (end portion on side opposite to rotation shaft 90 side) is connected to the rod of the above-described hydraulic cylinder 20. When the first arm 121 rotates around the rotation shaft 90 in accordance with reciprocating motion of the rod, the first valve body 13 of the regulating valve 21 moves upward and downward in the same manner as in the previously-described embodiments.

As seen from the rotation shaft 90, the second arm 122 (delaying and interlocking unit) is a rod-shaped member that extends in a downward direction further than the first arm 121. The second arm 122 is integrally provided with the first arm 121. That is, when the first arm 121 rotates around the rotation shaft 90, the second arm 122 rotates around the rotation shaft 90 in accordance with the rotation of the first arm 121. An end portion of the second arm 122 (end portion on side opposite to rotation shaft 90 side) is rotatably connected to an upper end portion of the second valve rod 11B to which the second valve body 15 is attached. Note that, the second valve rod 11B is urged in a direction from an upper side to a lower side by a coil spring 40B as with the first valve body 13 described above.

Furthermore, a slot H1 is formed in an upper end portion of the second valve rod 11B. The slot H1 is a hole formed into a long circular shape that is elongated in a direction in which the second arm 122 extends. An end portion of the second valve rod 11B is connected to the slot H1 via a pin P. The pin P can freely move in the vertical direction inside the slot H1.

According to the above-described configuration, in a case where the hydraulic cylinder 20 is driven to open the regulating valve 21 first, the first arm 121 rotates around the rotation shaft 90 in an upward direction and the first valve body 13 is separated from the first valve seat 12. Accordingly, the regulating valve 21 is opened. At this time, the second arm 122 also rotates around the rotation shaft 90 but only the pin P that connects the second arm 122 and the second valve rod 11B slides upward along the slot H1 formed in the second valve rod 11B. Therefore, in this stage, the second valve rod 11B does not move upward. That is, the overload valve 22 is in a closed state.

In a case where the first arm 121 is further rotated upward in the above-described state, that is, in a case where the first arm 121 and the second arm 122 are rotated until the pin P reaches an upper end portion of the slot H1, the second valve rod 11B and the second valve body 15 are lifted up and the overload valve 22 is opened.

According to the above-described configuration as well, as with the previously-described embodiments, the second valve body 15 of the overload valve 22 can enter an opened state later than the first valve body 13 of the regulating valve 21. Therefore, it is possible to open the overload valve 22 after the openness of the regulating valve 21 reaches 100% such that a load of the steam turbine 81 is further increased.

In addition, in the above-described configuration as well, the regulating valve 21 and the overload valve 22 are driven by the single hydraulic cylinder 20, which is the common driving source. Furthermore, it is possible to interlock the regulating valve 21 and the overload valve 22 with each other only by providing the slot H1 in the second valve rod 11B. That is, it is possible to greatly simplify the configuration of the device and thus it is possible to considerably reduce manufacturing cost and maintenance cost.

Figure 5:
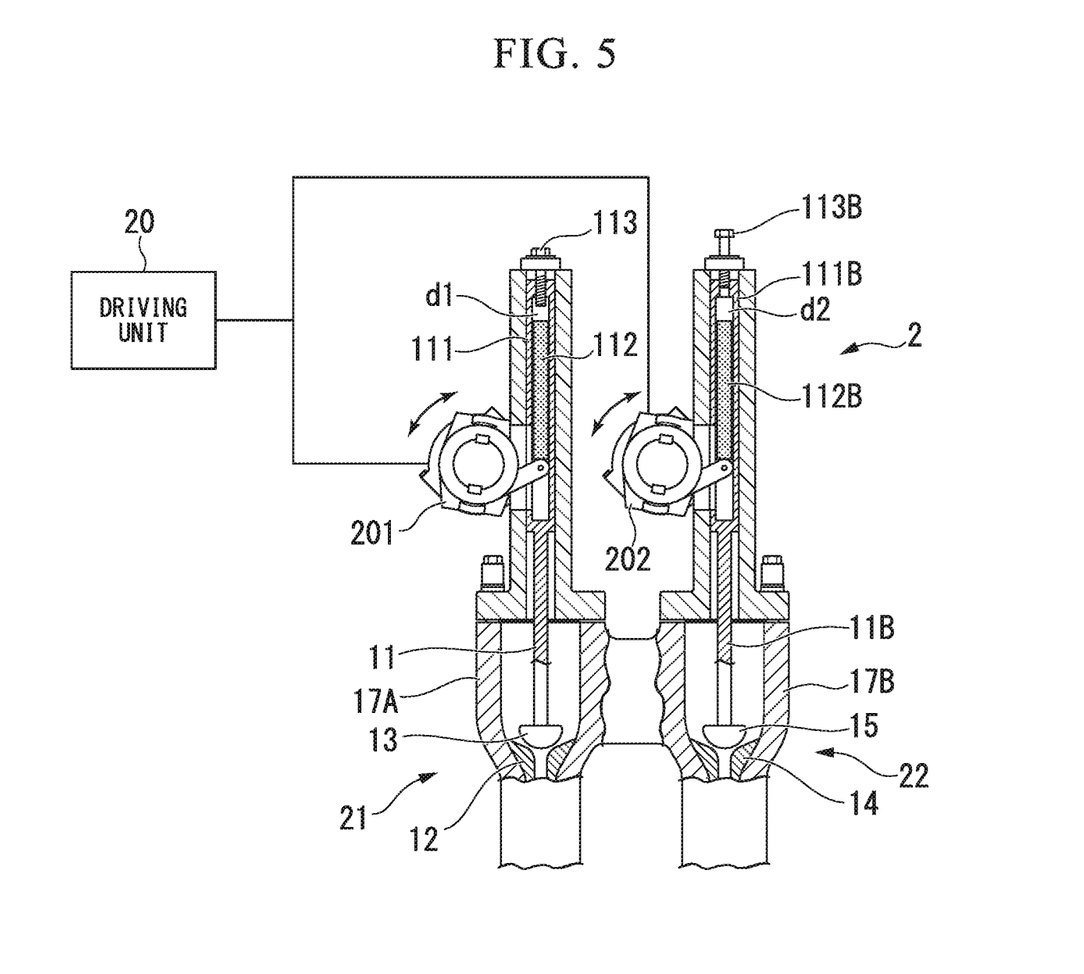
FIG. 5 is a schematic view showing a configuration of a valve device according to one or more embodiments of the invention.

Next, embodiments of the invention will be described with reference to FIG. 5. As shown in the drawing, the combination valve 2 in one or more embodiments is configured by connecting the regulating valve 21 as an independent valve and the overload valve 22 to each other. The regulating valve 21 includes the first valve seat 12, the first valve body 13, a first valve rod 11 (valve rod 11), and a first lever 201.

Furthermore, an approximately cylindrical sleeve 111 is attached to an upper portion of the first valve rod 11. A cavity is formed in a region close to an inner circumference of the sleeve 111. In the cavity, an approximately rod-shaped spindle 112 that is connected to the first lever 201 and that moves upward and downward integrally with the first lever 201 is provided. Specifically, a lower end portion of the spindle 112 is connected to the first lever 201. That is, the spindle 112 moves upward and downward inside the region close to the inner circumference of the sleeve 111 in accordance with the rotation of the first lever 201.

A hole into which an adjusting bolt 113 is inserted is formed in an upper end side of the sleeve 111. A portion of a shaft portion of the adjusting bolt 113 is exposed toward a region inside the sleeve 111. Furthermore, a gap d1 is formed between a lower end portion of the adjusting bolt 113 and an upper end portion of the spindle 112. A length of the gap d1 can be changed by adjusting the screwing amount of the adjusting bolt 113.

Similarly, the overload valve 22 includes the second valve seat 14, the second valve body 15, the second valve rod 11B, and a second lever 202. An approximately cylindrical sleeve 111B is attached to an upper portion of the second valve rod 11B. A cavity is formed in a region close to an inner circumference of the sleeve 111B. In the cavity, an approximately rod-shaped spindle 112B that is connected to the second lever 202 and that moves upward and downward integrally with the second lever 202 is provided. Specifically, a lower end portion of the spindle 112B is connected to the second lever 202. That is, the spindle 112B moves upward and downward inside the region close to the inner circumference of the sleeve 111B in accordance with the rotation of the second lever 202.

In an upper end side of the sleeve 111B, a hole into which an adjusting bolt 113B is inserted is formed. A portion of a shaft portion of the adjusting bolt 113B is exposed toward a region inside the sleeve 111B. Furthermore, a gap d2 is formed between a lower end portion of the adjusting bolt 113B and an upper end portion of the spindle 112B. A length of the gap d2 can be changed by adjusting the screwing amount of the adjusting bolt 113B.

Note that, in one or more embodiments, an example in which the length of the gap d2 in the overload valve 22 is set to be larger than the length of the gap d1 in the regulating valve 21 will be described.

The first lever 201 and the second lever 202 are connected to the first valve rod 11 and the second valve rod 11B respectively and are rotated by a single driver such as the hydraulic cylinder 20. The first valve rod 11 and the second valve rod 11B reciprocate in the vertical direction in accordance with the rotation of the first lever 201 and the second lever 202. More specifically, when the first lever 201 moves upward, first the spindle 112 moves upward. At this time, the spindle 112 abuts the shaft portion of the adjusting bolt 113 after moving upward by a distance in the vertical direction of the gap d1. When the first lever 201 moves upward after the spindle 112 abuts the shaft portion of the adjusting bolt 113, the spindle 112 lifts up the sleeve 111 and the first valve rod 11 via the adjusting bolt 113. Therefore, the regulating valve 21 enters an opened state.

Similarly, in the overload valve 22 as well, when the second lever 202 moves upward, the spindle 112B moves upward by a distance corresponding to the gap d2 and abuts the shaft portion of the adjusting bolt 113B. When the second lever 202 moves upward after the spindle 112B abuts the shaft portion of the adjusting bolt 113B, the spindle 112B lifts up the sleeve 111B and the second valve rod 11B via the adjusting bolt 113B. Therefore, the overload valve 22 enters an opened state.

Here, as described above, the gap d2 in the overload valve 22 is set to be larger than the gap d1 in the regulating valve 21. Therefore, when the first lever 201 and the second lever 202 are rotated by the same amount at the same time, the second valve body 15 of the overload valve 22 enters an opened state later than the first valve body 13 of the regulating valve 21 corresponding to a difference between the gap d2 and the gap d1.

According to the above-described configuration as well, as with the previously-described embodiments, the second valve body 15 of the overload valve 22 can enter an opened state later than the first valve body 13 of the regulating valve 21. Therefore, it is possible to open the overload valve 22 after the openness of the regulating valve 21 reaches 100% such that a load of the steam turbine 81 is further increased. In addition, in the above-described configuration as well, the regulating valve 21 and the overload valve 22 are driven by the single hydraulic cylinder 20, which is the common driving source.

Hereinabove, embodiments of the invention have been described with reference to the drawings. However, various modifications and improvements can be made with respect to the above-described configuration without departing from the scope of the invention.

Note that, in the embodiments, a configuration in which the regulating valve 21 is provided with one first valve seat 12 and one first valve body 13 and the overload valve 22 is provided with one second valve seat 14 and one second valve body 15 has been described.

However, embodiments of the regulating valve 21 and the overload valve 22 are not limited to this. For example, the regulating valve 21 may be configured to be provided with a plurality of first valve seats 12 and a plurality of first valve bodies 13 that abut or are separated from each other. Similarly, the overload valve 22 may be configured to be provided with a plurality of second valve seats 14 and a plurality of second valve bodies 15 that abut onto or are separated from each other. Furthermore, a configuration in which the regulating valve 21 is provided with a plurality of first valve seats 12 and a plurality of first valve bodies 13 and the overload valve 22 is provided with a plurality of second valve seats 14 and a plurality of second valve bodies 15 may also be adopted.

INDUSTRIAL APPLICABILITY

According to the above-described configuration, it is possible to achieve a valve device and a steam turbine having a simple configuration and a sufficient efficiency.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

REFERENCE SIGNS LIST

1 . . . main steam valve 2 . . . combination valve 10 . . . valve body holder 11 . . . valve rod 30 . . . arm 12 . . . first valve seat 13 . . . first valve body 14 . . . second valve seat 15 . . . second valve body 16 . . . through-hole 17 . . . valve case 18 . . . valve chamber 19 . . . through-hole (heat air hole) 20 . . . hydraulic cylinder 21 . . . regulating valve 22 . . . overload valve 90 . . . rotation shaft 40 . . . coil spring 51 . . . blade 52 . . . vane 60 . . . casing 61 . . . overload steam inlet 70 . . . flow guide 71 . . . slit 80 . . . steam turbine equipment 81 . . . steam turbine 83 . . . high-pressure steam turbine 84 . . . low-pressure steam turbine 85 . . . boiler 86 . . . reheater 87 . . . power generator 111, 111B . . . sleeve 112, 112B . . . spindle 113, 113B . . . adjusting bolt 121 . . . first arm 122 . . . second arm 131 . . . first valve main body 132 . . . first insert portion 133 . . . first cap portion 151 . . . second valve main body 152 . . . second insert portion 153 . . . second cap portion 201 . . . first lever 202 . . . second lever 511 . . . platform 512 . . . blade main body 513 . . . outer shroud 521 . . . outer ring 522 . . . vane main body 523 . . . inner ring 11B . . . second valve rod 12C . . . arm connection portion 40B . . . coil spring d1, d2 . . . gap H1 . . . slot H2 . . . slot O . . . axis R . . . rotor S . . . steam flow channel 52 . . . branch flow channel

The invention claimed is:
1. A valve device comprising:
 a main steam valve that is provided on a steam flow channel that guides steam to a steam turbine and that adjusts an opening and closing state of the steam flow channel;
 a regulating valve that is provided on the steam flow channel to be connected to the main steam valve in series and that includes:
  a first valve seat exposed in the steam flow channel; and
  a first valve body that abuts or is separated from the first valve seat to adjust a flowing state in the steam flow channel;
 an overload valve that is provided on a branch flow channel that connects the steam turbine to a portion of the steam flow channel between the main steam valve and the regulating valve, wherein the overload valve includes:
  a second valve seat that is exposed in the branch flow channel; and
  a second valve body that abuts or is separated from the second valve seat to adjust a flowing state in the branch flow channel; and a hydraulic cylinder that drives the first valve body and the second valve body as a common driving source of the first valve body and the second valve body such that the first valve body and the second valve body are interlocked with each other, wherein the second valve body of the overload valve comprises a through-hole through which a portion of steam in the branch flow channel flows, and the through-hole is in a continuously-open state even when the overload valve is closed.

2. The valve device according to claim 1, further comprising:

a valve body holder that delays the driving of the second valve body of the overload valve until the regulating valve enters a fully-opened state.

3. The valve device according to claim 1, wherein the steam turbine includes a plurality of pressure stages arranged from a high-pressure side to a low-pressure side, wherein the steam flow channel is connected to a first pressure stage in the steam turbine that is closest to the high-pressure side, and wherein the branch flow channel is connected to a second or subsequent pressure stage in the steam turbine.

4. The valve device according to claim 3, further comprising:

a flow guide that is provided between the overload valve and the plurality of pressure stages and that changes a flowing direction of steam passing through the overload valve.

5. The valve device according to claim 4, wherein the flow guide includes a guide main body that extends in a circumferential direction of the steam turbine, and wherein the guide main body comprises a slit that extends from an outer circumferential side of the steam turbine to an inner circumferential side of the steam turbine toward the low-pressure side from the high-pressure side.

6. A steam turbine equipment comprising:

the valve device according to claim 1; and the steam turbine driven by steam guided through the valve device.

* * * * *